United States Patent

Dawn et al.

[15] 3,665,750
[45] May 30, 1972

[54] BURN RATE TESTING APPARATUS

[72] Inventors: Frederick S. Dawn, Houston; William L. Gill, Seabrook, both of Tex.

[73] Assignee: The United States of America as represented by the Administrator of the National Aeronautics and Space Administration

[22] Filed: Aug. 28, 1969

[21] Appl. No.: 853,641

[52] U.S. Cl. .......................................................73/15 R
[51] Int. Cl. ......................................................G01n 25/00
[58] Field of Search .................................73/15, 35; 431/66

[56] References Cited

UNITED STATES PATENTS

| 2,771,942 | 11/1956 | Miller | 431/66 |
| 2,636,388 | 4/1953 | Blegen | 73/15 |
| 3,148,531 | 9/1964 | Stoll et al. | 73/15 |
| 3,315,081 | 4/1967 | Williams, Jr. | 73/35 |

FOREIGN PATENTS OR APPLICATIONS 144,296  5/1961  U.S.S.R. .....................................73/15

OTHER PUBLICATIONS

Tallant, " Automatic Ignition and Timing of the Flame in the Vertical Fire Resistance Test," in Textile Research Journal, Vol. XXVII, No. 10, Oct. 1957

*Primary Examiner*—Richard C. Queisser
*Assistant Examiner*—Herbert Goldstein
*Attorney*—Edward K. Fein, Marvin F. Matthews and G. T. McCoy

[57] ABSTRACT

An apparatus for testing the burn rate between two spaced apart points on a sample of material. It includes an angularly adjustable support holder, an electrically ignited torch supplied with an independent supply of oxygen, a flame shutter between the torch and the sample holder and photocells positioned to sense ignition of the test material and the rate of burn between two spaced apart points on the material.

11 Claims, 5 Drawing Figures

Patented May 30, 1972

Frederic S. Dawn
William L. Gill
INVENTORS

BY
Edward K. Fein
ATTORNEYS

Patented May 30, 1972

Frederic S. Dawn
William L. Gill
INVENTORS

BY Edward K. Fein

ATTORNEYS

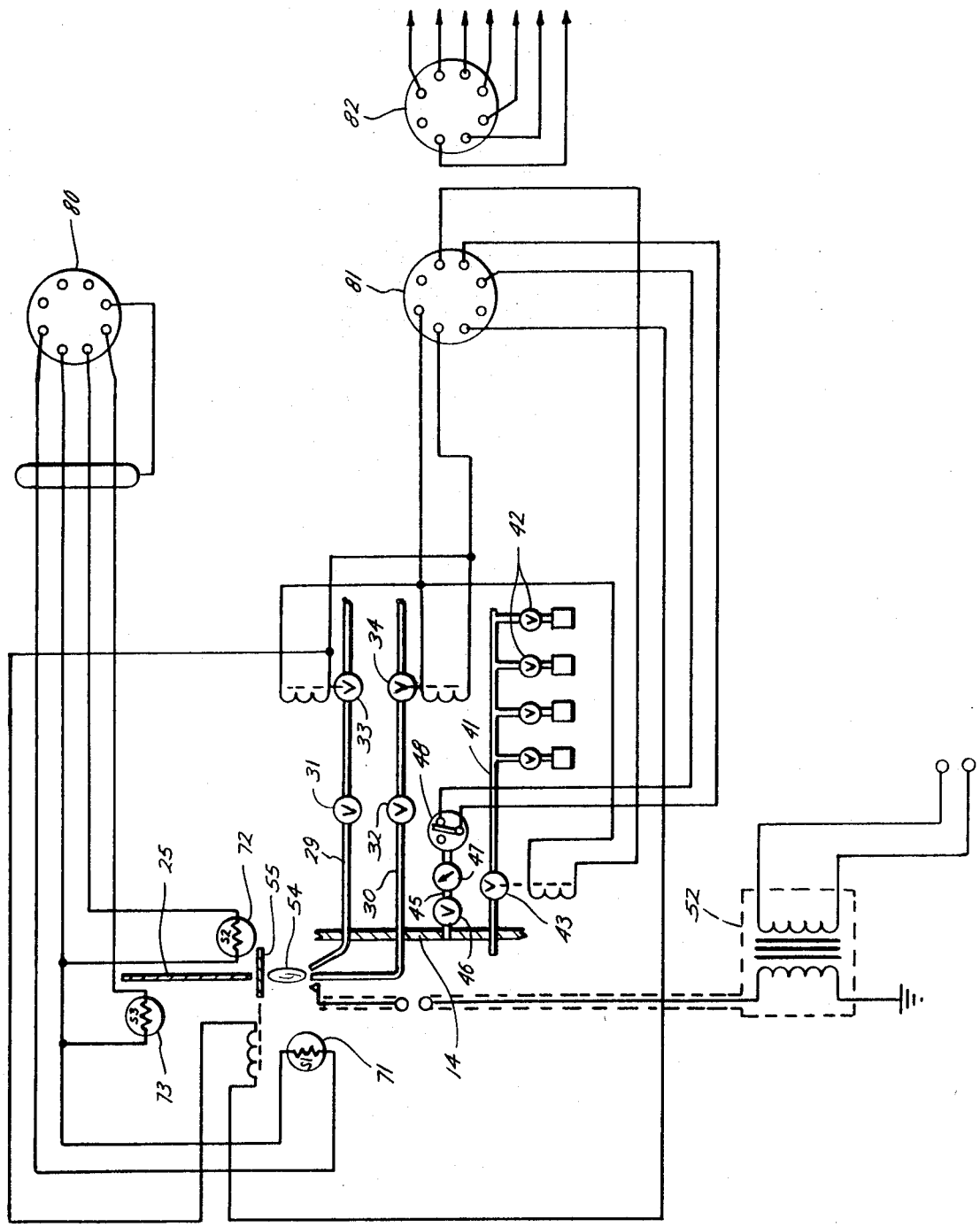

BURN RATE TESTING APPARATUS

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

This invention relates to a burn rate test apparatus. More particularly, it relates to an apparatus for testing the burn rate between two spaced apart points on the tester material in various environments and at different angles with respect to the burner flame.

2. Description of the Prior Art

There has long been a need for an apparatus and method of testing material under various conditions such as those that might be encountered in a space environment, for example, and to provide an accurate readout of the rate of burn of such material. Apparatuses have been developed in the past for measuring certain parameters of the burn characteristic of a material, but none of them have been fully satisfactory for various reasons. For example, one prior art apparatus utilizes strings which are laterally spaced apart on the test material and which strings are burned as an incident of the burning of the test material adjacent thereto. The burning of the strings is arranged to effect a clocking operation. However, such a system is not as accurate as might be desired. Moreover, the burning of the aforesaid strings may have an adverse effect on the timing of the burning of the test material. Further, the aforesaid apparatus has no independent oxygen supply, with the result that the burning of the test material will result in depletion of oxygen in the environment where the test is conducted, thereby effectively limiting the test environment to an earth atmosphere.

Further, it is also desirable to have a burner which provides a flame which is applied to the test material only at a desired point in time after the flame has reached the desired intensity. This is accomplished in the present invention by means of a unique shutter arrangement which masks the flame from the test material until the operator establishes that the flame has reached steady-state conditions and the test environment is as desired at which time he may remotely actuate the shutter subjecting the sample material to the flame at a precise point in time. It is also desirable to have an apparatus which will not only test the rate of burning, but also the rate of burn-through as another indication of the flammability of the test material. It is also desirable to be able to remotely change the angle at which the test material is supported with respect to the burner flame, which has not heretofore been possible with the prior art devices.

It is also desirable to be able to control the environment in which said testing is carried out to simulate a space environment, for example.

SUMMARY OF THE INVENTION

Accordingly, it is an object of the present invention to provide an improved burn rate testing apparatus which solves the aforesaid problems and provides the desired characteristics, as stated above.

Briefly stated, this invention includes a material sample holder which may be adjustable with respect to the angle of inclination. It also includes a gas burner which preferably has an independent supply of oxygen and a fuel gas. Means are provided for igniting the burner and for sensing the rate of burn-through of the material and also the rate of burning of the material between two laterally spaced apart points on the test material. Certain embodiments of the invention may also include a remotely operated flame shutter removably supported between the flame of the burner and the sample material. The preferred means of sampling the rate of burning of the sample material includes a plurality of spaced apart photocells positioned to sense the burning of that portion of the test material adjacent thereto. It is also desirable to have recording means or readout means for recording or reading out the interval of time elapsed between electrical signals generated by the photocells. Certain embodiments of the invention may also include means for controlling the environment in which the burner and the sample holder are situated during the testing.

BRIEF DESCRIPTION OF THE DRAWINGS

Reference to the drawings will further explain the invention wherein like numerals refer to like parts and in which:

FIG. 5 is a schematic layout of certain portions of the invention and the electrical circuitry connected therewith.

DESCRIPTION OF THE PREFERRED EMBODIMENT

Figure 1:
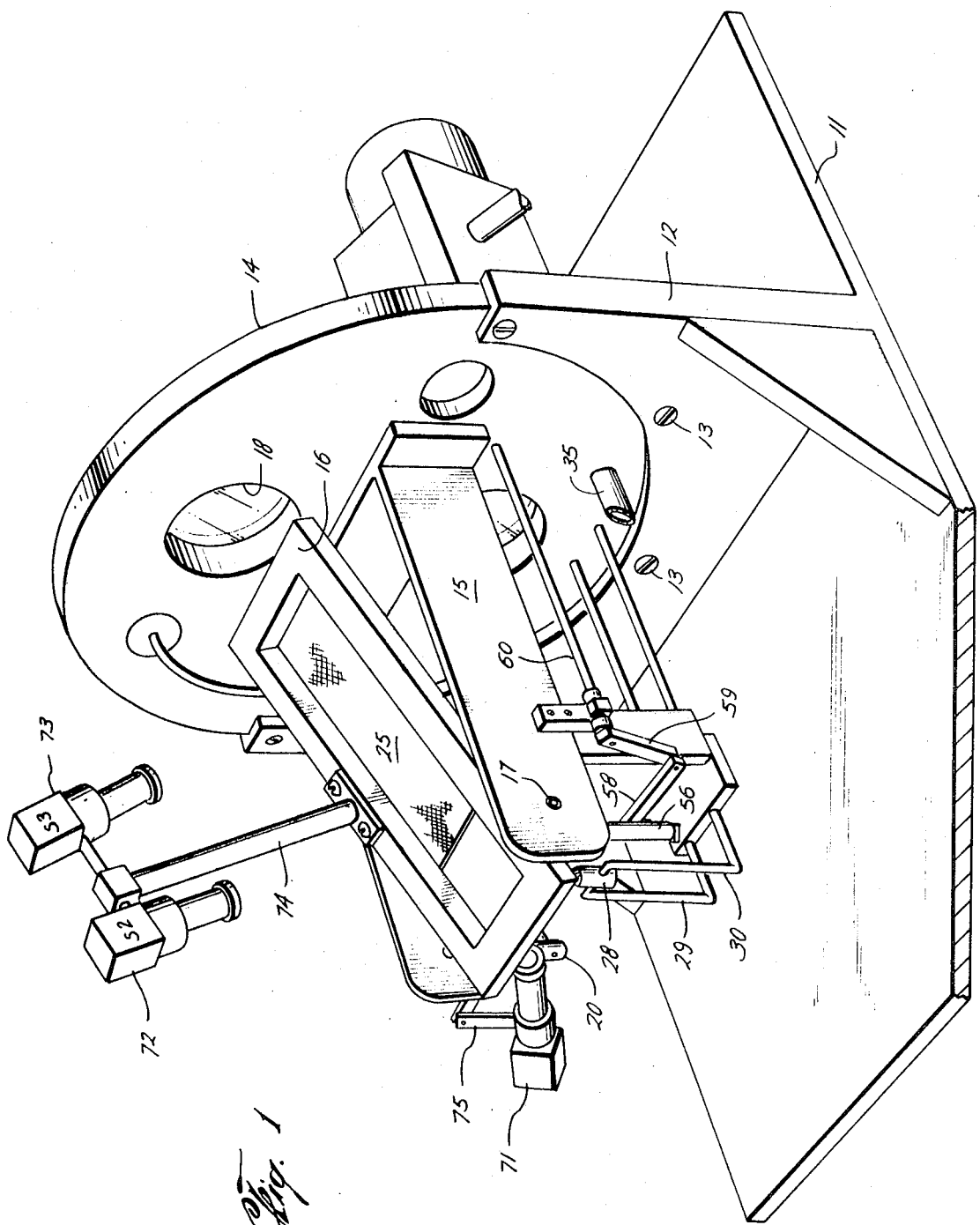
FIG. 1 is a perspective view of one embodiment of the invention showing a portion of the environmental housing removed for convenience purposes, and with the test material frame supported at an angle of inclination with respect to the flame.

Referring now to FIG. 1, the apparatus of this invention includes a base 11 which supports an upstanding partition wall 12 which in turn has attached thereto by screws 13 a chamber flange 14 having a see-through port 18. It is to be understood that wall 12 and flange 14 form the forward end of an otherwise enclosed chamber, with base 11 and supported elements being arranged for positioning in the aforesaid chamber.

Flange 14 has attached thereto for support thereby a generally U-shaped frame support 15, the outward ends of which pivotally support the test material frame 16 by means of axle 17 which is pivoted for rotation in frame support 15.

Frame 16 is splined or otherwise attached to axle 17 for rotation therewith. The rearward side of axle 17, as shown in FIG. 1, has attached thereto a frame angle adjustment arm 20, the details of which are better seen in FIGS. 2, 3 and 4.

Arm 20 has a cable 21 attached thereto which passes over pulley 22 which is operated by motor 23. Hence, by taking up and letting out on cable 21, the angle of inclination of frame 16 with respect to the horizontal can be rotated up to an angle of approximately 90° such that the flame of the burner, which is described hereinafter, may impinge against the test material at any angle between 0° and 90°. Frame 16 is arranged to support a length of test material 25 on the lower side thereof by means of hold down clips (not shown).

The invention also includes a flame burner having an independent supply of oxygen and an ignition fuel. The burner is comprised of flame nozzle 28 positioned generally below one end of frame 16. Flame nozzle 28 has connected thereto two fuel lines designated by the numeral 29 and numeral 30, one of which is connected to a source of oxygen and one of which is connected to a source of a combustible gas, such as propane. Mixing of the oxygen and the fuel gas occurs in flame nozzle 28 in essentially stoichiometric proportion to prevent altering the proportion of environmental constituents as a result of burning of the flame. As seen in FIG. 5, fuel lines 29 and 30 have manual valves 31 and 32 connected therein, respectively, and solenoid valves 33 and 34 respectively. Solenoid valves 33 and 34 are arranged to be operated by an electrical signal from flame ignition sensing means to be described hereinafter.

Means are also provided for controlling the atmosphere in the chamber in which the test is to be conducted. Chamber flange 14 is provided with an environmental line connector 35 which leads into the chamber and which supports gas tube 36 having a plurality of holes 37 therein. Connector 35 is attached on the other side to a gas line 41, as seen in FIG. 5, which in turn connects to a plurality of roto-meter valves 42, each of which is connected to a different supply of gas, whereby the environment inside of the chamber in which the testing is carried out can be adjusted to a preselected and metered quantity of each such gas. In addition, line 41 is provided with a solenoid valve 43, which is electrically operated, as for example by electrical sensing means, such that an inert gas such as nitrogen, for example, can be applied through line 41 and tube 36 to purge the chamber when the test is completed.

Figure 3:
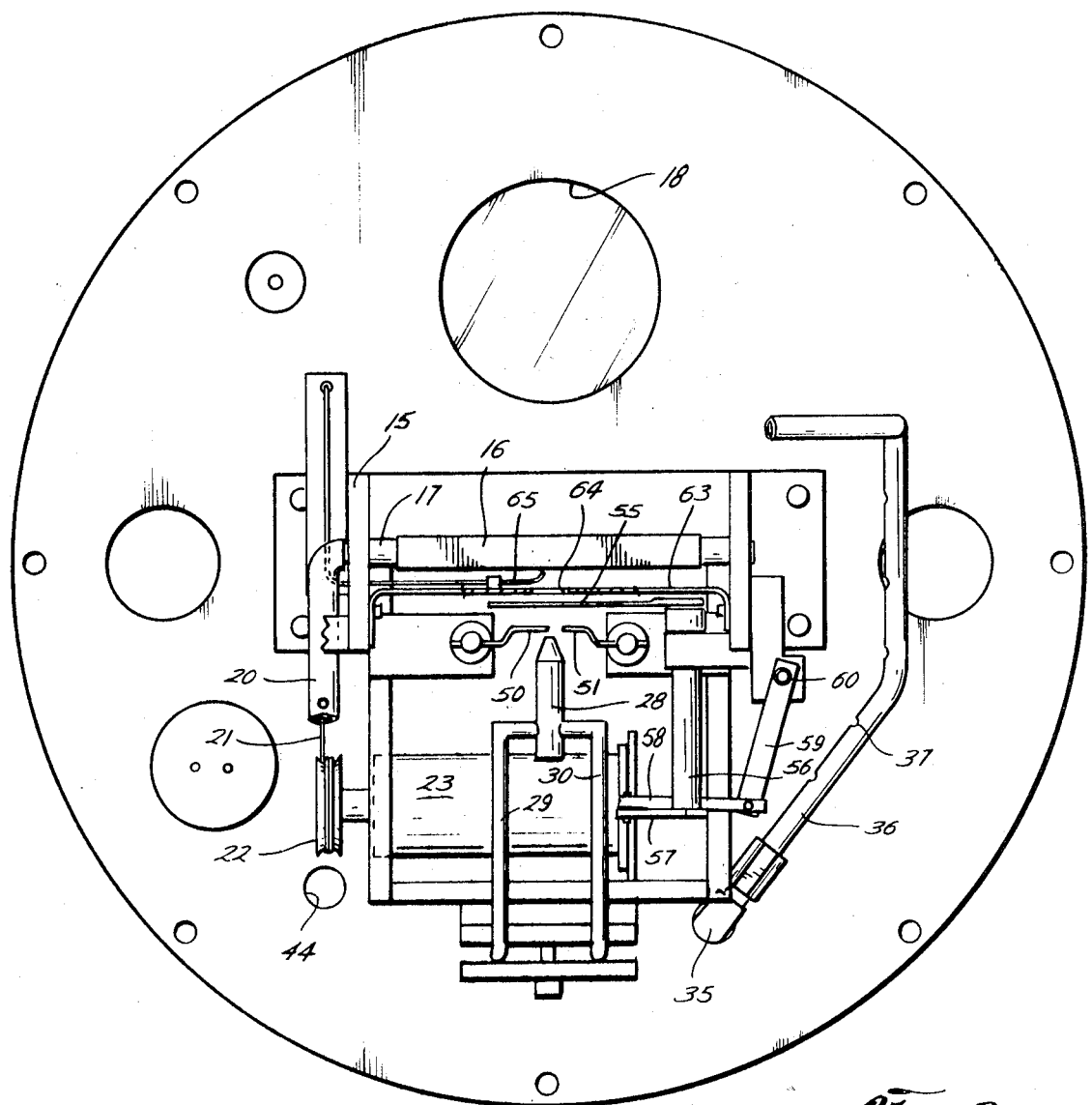
FIG. 3 is generally an end elevation view taken along line 3—3 of FIG. 2.
Figure 4:
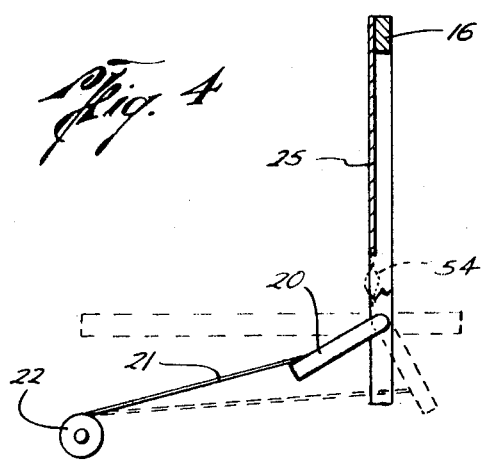
FIG. 4 is generally a schematic side elevation view of the test material support frame shown in the upright position in solid line and in the down position in broken line.

In addition, chamber flange 14 is provided with an opening 44, shown in FIG. 3, which connects with pressure line 45, shown in FIG. 5, which has a manual valve 46, a pressure meter 47 and a pressure switch 48 therein. Valve 46 may be connected to an appropriate source to control the pressure level in the chamber, which pressure can be monitored by meter 47 and which can be utilized to actuate pressure switch 48.

Means are also provided for igniting the fuel gases emerging from flame nozzle 28 when the operator desires the test to begin, for example, after the test atmosphere in the chamber is established and the flame has reached a steady state condition, and this conveniently takes the form of a pair of copper electrodes 50 and 51, which are spaced apart over the upper end of flame nozzle 28, such that when an electrical impulse is applied thereto, a spark will occur creating ignition of the flame. Electrodes 50 and 51 may be connected with any suitable electrical source, as for example transformer 52, as shown in FIG. 5. It is to be understood that electrodes 50 and 51 are connected to appropriate conductors which are insulated against heat levels expected in the chamber.

Figure 2:
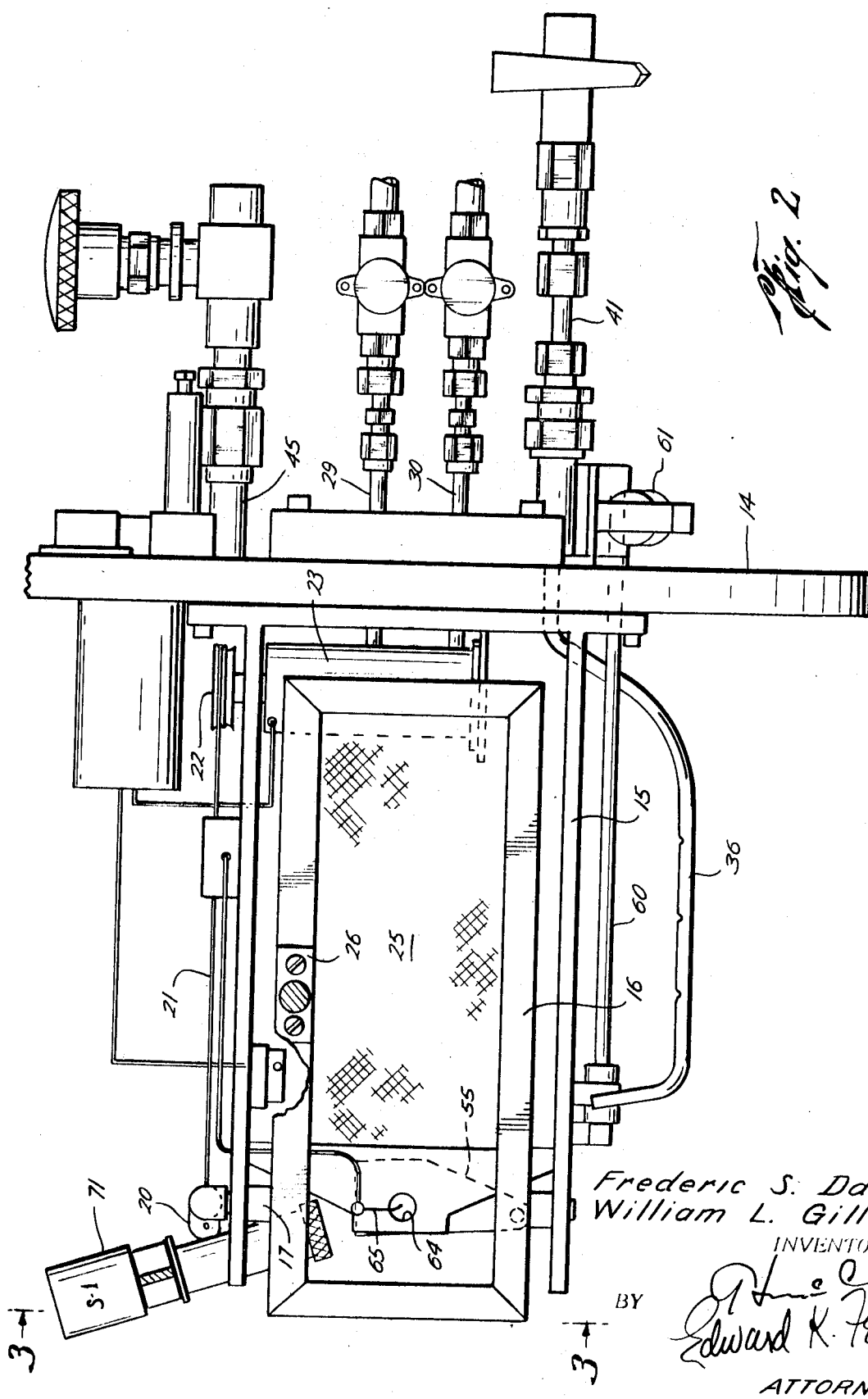
FIG. 2 is a generally top plan view of the apparatus shown in FIG. 1, but having the test material support frame lowered.

Means are also provided for shielding the flame 54 created above flame nozzle 28 from contacting the test material until a predetermined time. These means conveniently take the form of a remotely operated movable shutter 55 which is spaced above flame nozzle 28 and below the test material 25. The right end of flame shutter 55, as viewed in FIG. 3, is connected to a shaft (not shown) passing through shaft guide 56 with the aforesaid shaft having shutter arm 57 attached to the lower end thereof, which in turn is pivotally connected at the other end thereof to shutter link 58, the opposite end of which is pivotally connected to shaft arm 59 which in turn is splined or otherwise connected to shutter rod 60, which is arranged for rotation by flame shutter solenoid 61, as shown in FIG. 2. It is to be understood that solenoid 61 may be operated by an electrical signal supplied thereto. Further, the lower side of the shutter 55 is provided with a heat resistant material, such as asbestos, to preserve the life thereof.

Mounted immediately above shutter 55 is a brace 63, the ends of which are attached to the outward ends of frame support 15 and which has an opening 64 through which the heat of flame 54 projects.

Immediately above brace 63 there is supported a calibration thermocouple 65 which is connected to an appropriate conductor leading to the outside of the chamber for reading the temperature created by flame 54.

Sensing means are also provided for sensing the ignition or start of the burn test and for measuring the rate of burn. These sensing means include a first sensor 71 which is mounted on an appropriate adjustable bracket 75 attached to frame support 15. Sensor 71 is in the form of a photocell and is adjustable to be actuated either by ignition of flame nozzle 28 or by flame 54 after it has passed open shutter 55.

Two additional sensors 72 and 73 are also provided for detecting burn-through of flame 54 through test sample material 25 and the rate of propagation of the flame along material 25. Sensors 72 and 73 are also preferably photocells and are supported on support bracket 74 attached to frame 16 for movement therewith. Sensors 72 and 73 are responsive to ignition of spaced apart points of test material 25, and produce an electrical output the same as sensor 71. Hence, sensors 72 and 73 provide an electrical output which is used to drive readout means, such as the pins or styli of a conventional strip chart which is advanced at a measured time rate whereby the strip chart records the time interval required for the propagation of the flame between two spaced apart points on test material 25. Propagation can be tested at any angle of material 25 with respect to flame 54 by adjusting the angle of frame 16. In addition, sensor 71 may also be connected to operate another stylus of the strip chart to record either ignition or passage of the flame past open shutter 55, whereby the time interval required for initial burn-through of test material 25 may be recorded also.

In operation, the apparatus is installed in the aforesaid chamber with chamber flange 14 providing the seal closure therefor.

The pressure in the chamber is controlled through pressure line 45 and the gaseous environment is controlled through line 41. Fuel gases emerging from nozzle 28 will be ignited by electrodes 50 and 51. At ignition solenoid valves 33 and 34 open allowing the fuel gases to ignite at nozzle 28, with valves 33 and 34 being operated in response to a signal generated by sensor 71. Shutter 55 is opened electrically by providing an electrical signal to flame shutter solenoid 61 at an appropriate time allowing flame 54 to impinge against test material 25.

The aforesaid sensing means and solenoids are connected by appropriate conductors through multi-pin plugs 80, 81 and 82.

Thermocouple 65 permits the testing of the flame for temperature level and control purposes. By this arrangement of the apparatus, the time for flame propagation between two points on test material 25 can be measured at any angle from vertical to horizontal. In addition, it permits the controlled environment under which the flame propagation is tested, including not only the pressure level, but the composition of the atmosphere therein. Further, the burner is provided with a separate source of oxygen which does not deplete oxygen from the environment, which might adversely effect the results of the test.

There are many advantages to the foregoing system, including the fact that a flame of known temperature characteristics is provided which has its own oxygen supply which prevents the depletion of the chamber oxygen. In addition, a shutter is provided whose opening is precisely observed on a recorder so that the instant of flame impingement against the test material is precisely observed and recorded. Further, the rate of flame propagation along the material is precisely observed by the sensors and appropriately recorded. The burning rate as a function of the sample angle with respect to vertical is also observable. The gas composition under which burning is to take place is not changed by depletion of oxygen.

It is to be understood that the aforesaid apparatus can be used either inside of or outside of the chamber, but the chamber is useful for controlling and creating environmental conditions, such as space conditions.

The system is uniquely designed for multiple purpose testing materials in a multi-gas mixture atmosphere at a pressure range from 20 p.s.i. to $1 \times 10^6$ to determine flame resistance. The system can be operated in an environment range from $-250°$ F. to $600°$ F. for periods up to 14 days and longer. The multi-gas atmosphere is controlled with the regulated rotometer valves calibrated to control the percent of gas required for achieving the atmosphere in the chamber.

Modifications and further embodiments of the invention will be apparent to those skilled in the art in view of the description.

What is claimed is:

1. In a burn rate testing apparatus adapted for operation in an enclosed environmental chamber, the combination comprising:
   a material sample holder;
   gas burner means;
   independent means for supplying oxygen and fuel gas to said gas burner means in essentially stoichiometric proportions to prevent altering the proportions of environmental constituents in the enclosed chamber;

means for controlling and monitoring the atmosphere in the enclosed chamber to maintain integrity thereof;

means for igniting said burner; and means for sensing the rate of burning of said sample material between two laterally spaced apart points on said material.

2. The invention as claimed in claim 1 including:

a remotely operated flame shutter removably supported between the flame of said burner and the sample material held by said sample holder.

3. The invention as claimed in claim 1 including:

means for remotely adjusting the angle of said sample holder relative to the flame of said burner.

4. The invention as claimed in claim 1 including:

means for electrically igniting said burner.

5. The invention as claimed in claim 1 wherein:

said means for sensing the rate of burning of said sample material includes a plurality of spaced apart photocells positioned to sense the burning of that portion of said material adjacent thereto.

6. The invention as claimed in claim 5 including:

another photocell positioned to sense impingement of flame on said material sample.

7. The invention as claimed in claim 5 including:

recording means for recording the interval of time elapsed between electrical signals generated by at least any two of said photocells.

8. The invention as claimed in claim 1 wherein:

said means for controlling environment include means for varying the pressure level of said environment.

9. The invention as claimed in claim 1 wherein:

said means for controlling environment include means for supplying at least one inert gas to said environment.

10. The invention as claimed in claim 1 including:

means for sensing impingement of flame on said material sample; and wherein said burner and said means for sensing impingement of flame are positioned adjacent said material sample holder at one face thereof, and said means for sensing the rate of burn is positioned adjacent said material sample holder at the opposite face thereof, such that rate of burn-through of material may also be determined.

11. The invention as claimed in claim 1 wherein said means for igniting said burner includes:

signal responsive value means for selectively permitting passage of gas to said gas burner;

electrode igniters positioned adjacent said burner; and signal generating sensor means for opening said signal responsive valve means upon sensing activation of said electrode igniters, thus permitting passage of gas to said burner.

* * * * *